UNITED STATES PATENT OFFICE.

FRANZ KONRAD, OF ZSCHIEREN, NEAR DRESDEN, SAXONY, GERMANY.

COMPOSITION FOR FIREPROOFING FABRICS.

SPECIFICATION forming part of Letters Patent No. 308,679, dated December 2, 1884.

Application filed February 11, 1884. (No specimens.)

*To all whom it may concern:*

Be it known that I, FRANZ KONRAD, of Zschieren, near Dresden, Kingdom of Saxony, German Empire, have invented an Improvement in an Antiseptic and Fireproofing Preparation for Fabrics and other Substances, of which the following is a specification.

This invention relates to a liquid preparation adapted to fabrics, such as sleeping apparel and bed-clothes, for rendering the same fire-proof and repellent to vermin, moisture, and adapted to counteract infection from spores, fungi, bacteria, &c. I apply this preparation to fabrics in a peculiar manner, hereinafter described. To prepare this liquid I proceed as follows: I employ one hundred liters (equal to one hundred kilograms) of water, and add ten kilograms of sulphate of ammonia, one kilogram of carbonate of ammonia, 0.5 (one-half) kilogram of borax, 0.1 (one-tenth) kilogram of bichloride of mercury; and I further add a decoction of peppermint, which I produce by adding six liters of water to two kilograms of peppermint, the latter consisting of the plant with blossom, but without root. The peppermint and the water I allow to remain together at a temperature of about 85° Celsius, and I then pour off the decoction, which is added to the above solution; and I further add to the solution one hundred and fifty grams of solution of carbolic acid, which has a specific gravity of about 1.062 at 20° Celsius. Such is the solution which I use for the purpose above specified. I have found that the solution formed of the ingredients in about the proportion above specified answers well for the purpose in view; but I wish it to be understood that I do not limit myself to the exact figures above given, as these may be altered without departing from or defeating the object; but I have found it necessary to mix the above-specified ingredients and to impregnate the articles with this solution, instead of applying each ingredient separately to the article to be made fire-proof and antiseptic. As to the fire-proof quality which I impart to the fabrics or articles, I wish it to be understood that these articles will not burn with a flame.

I apply the fluid in the following manner: I first put the fabric or articles to be impregnated into a closed vessel, into which I cause steam from a boiler to enter. The period for which I allow the steam to act on the articles in the vessel will depend upon the nature of the article under treatment. The steam must not be allowed to destroy or injure in any way the articles, but simply to render them capable of being fully impregnated by the solution. I then turn off the steam and allow the steam in the closed vessel to escape by a cock, tap, or valve. After having closed this outlet I immediately afterward cause the solution to enter into the closed vessel, so as fully to surround the articles under treatment, which, by the foregoing action of the steam, are well prepared for the solution to enter into all the fibers. I then allow the solution to run off, and collect the same for further use. The articles are taken out from the vessel and are subjected to heat or hot air or wind in order to dry. The articles thus treated will not only prove to be fire-proof, but also to be antiseptic—that is to say, they will be protected against putrefaction, and will resist or repel the deposit for morbid or diseased matter, or fungi, bacteria, or vermin. Vermin will never enter into such articles.

The qualities specified will highly increase the value of bed-clothes, wearing-apparel, mattresses, &c.

I do not herein make claim to the separate use of the ingredients set forth.

I claim as my invention—

The liquid for rendering fabrics fire-proof, composed of a solution of sulphate of ammonia, carbonate of ammonia, borax, bichloride of mercury, peppermint, and carbolic acid, substantially as set forth.

In testimony whereof I have hereunto set my hand, this 20th day of December, 1883, in the presence of two subscribing witnesses.

FRANZ KONRAD.

Witnesses:
WILHELM WIESENHÜTTER,
GEORG RICHTER.